UNITED STATES PATENT OFFICE.

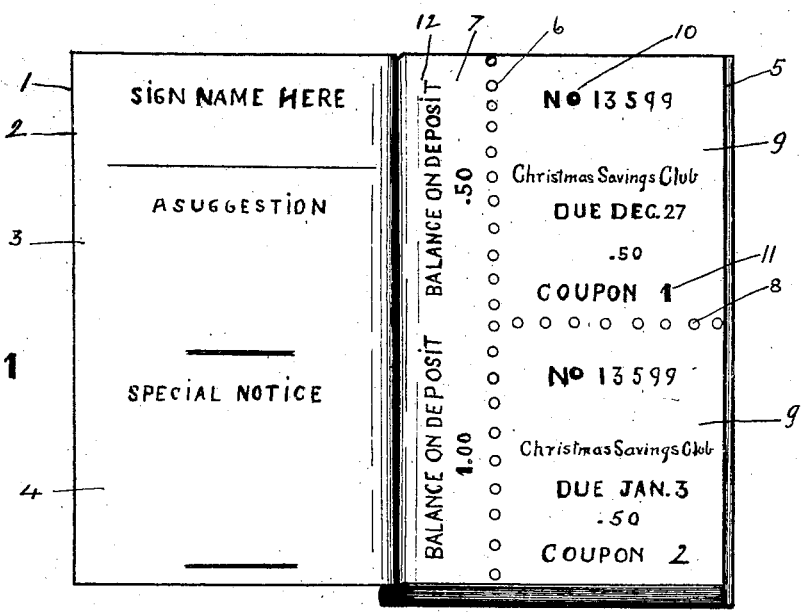
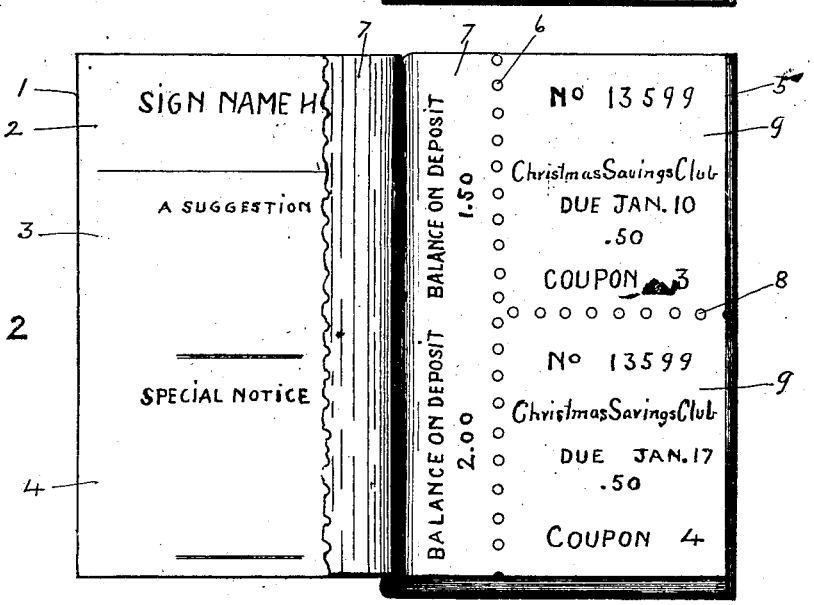

FRENCH R. WHITE, OF INDEPENDENCE, MISSOURI.

DEPOSIT-BOOK.

1,309,869.  Specification of Letters Patent.  Patented July 15, 1919.

Application filed November 24, 1915. Serial No. 63,225.

*To all whom it may concern:*

Be it known that I, FRENCH R. WHITE, a citizen of the United States, residing at Independence, in the county of Jackson and State of Missouri, have invented a new and useful Improvement in Deposit-Books, of which the following is a specification.

My invention relates to improvements in deposit books, and the object of my invention is to provide a deposit book having a series of sheets divided each into serially numbered coupons, and each coupon bearing the pre-determined amount to be deposited and the pre-determined date for making such deposit, and also, a number for identifying the depositor, each sheet shall have a non-detachable stub which shall bear opposite each coupon connected therewith the amount of balance on deposit to the credit of the depositor at the date stated on the coupon; and also, to divide the inner side of the upper cover into a space to receive the signature of the depositor, a space for imprinting therein pertinent suggestions to the depositor, and a space for displaying special notices relating to the deposit and withdrawal of funds.

The provisions mentioned enables the depositor to ascertain without mental process the amount to his credit at any time, and to know without inquiry the time and amount of the deposits to be made, the detaching of the coupon and its presentation to the bank, to be retained by it, obviates the necessity for writing a deposit memoranda at the making of deposits, thus leaving the transaction free from the usual preliminaries incident to making deposits. The validating stamp of the bank impressed on the stub certifies the deposit and the amount of balance at the same time and the coupon is filed in due course.

Referring to the drawings:—Figure 1, is a perspective view of the deposit book with the upper cover turned back, exposing the first sheet, and Fig. 2, is a similar view and showing the coupons 1 and 2 detached from the stub, the latter being turned back, exposing the second sheet.

The numeral 1, designates the upper cover of the deposit book turned back and showing its inner side which is divided into a space 2, to receive the depositor's signature, a space 3, for pertinent suggestive matter, not shown, and a space 4, for special notices, not shown. The deposit book contains a series of leaves 5, in this instance 24 leaves, each sheet is divided longitudinally by a line of perforations 6, to form the stub portion 7, the outer portion of the sheet is divided transversely intermediate its length by a line of perforations 8, thereby forming two detachable coupons 9. Each coupon will preferably bear the depositor's identification number, as for example "No. 13599", the pre-determined date for depositing and the pre-determined amount to be deposited on such date, as for example—"due Dec. 27—50", as shown at 10, in Fig. 1, the serial number of the coupon, as for example—"Coupon 1" as shown at 11, in Fig. 1, and the title of the saving club or association, as in this instance—"Christmas savings club". The stub 7, will preferably bear opposite each coupon, the pre-determined balance on deposit to the credit of the depositor at the date stated on the coupon, as for example—"Balance on deposit— .50", as shown at 12, in Fig. 1. The identifying number is also impressed on the outer side of the cover.

The person desiring to become a member of the club, selects the class or rate of deposit, in this instance—a deposit of fifty cents each week. The member writes his signature in the space 2, on the inner side of the cover 1. The deposit book and all the coupons contained in the book are numbered, in this instance—"No. 13599", and thereafter the member and his account is known and identified by such number. The member detaches the coupon 1, and deposits the same with fifty cents, the bank receives and retains the same and validates the stub stating the amount of balance on deposit to the credit of the depositor which appears on the stub opposite the place previously occupied by the detached coupon 1. The validating of the stub is accomplished by applying thereto the imprint of a stamp in the well known manner. The validation operates to certify the deposit and the balance on deposit. When all the coupons have been deposited the aggregate of the deposits will appear on the stub. Although I show the deposit adapted for periodical deposit of fixed amounts, it is understood that the coupons and stub may be adapted for any class of methodical payments, such as instalments of money to be paid periodically for any purpose without departing from my invention or the scope of the appended claim.

Having described my invention I claim;

A deposit book, comprising a plurality of leaves arranged to form stub portions and a plurality of separable coupon portions, said stub portions bearing in progressive order and opposite to the respective coupons indication of the balance on deposit at the time the respective coupons are detached therefrom by the bank, said coupons bearing predetermined dates for making deposits and the amounts to be deposited on such dates and likewise bearing the depositors identification number and a coupon serial number.

FRENCH R. WHITE.

Witnesses:
T. DAHLSTROM,
JOHN C. STEARNS.